United States Patent
Paustian et al.

(10) Patent No.: US 10,162,787 B1
(45) Date of Patent: Dec. 25, 2018

(54) MULTICORE SAFE PCIE SOLUTION

(71) Applicant: Rockwell Collins, Inc., Cedar Rapids, IA (US)

(72) Inventors: Wade D. Paustian, Cedar Rapids, IA (US); Lloyd F. Aquino, Marion, IA (US); Branden H. Sletteland, Marion, IA (US); Joshua R. Bertram, Ames, IA (US); John L. Hagen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 225 days.

(21) Appl. No.: 15/192,148

(22) Filed: Jun. 24, 2016

(51) Int. Cl.
*G06F 13/36* (2006.01)
*G06F 13/42* (2006.01)
*G06F 9/455* (2018.01)

(52) U.S. Cl.
CPC ...... *G06F 13/4282* (2013.01); *G06F 9/45558* (2013.01); *G06F 13/36* (2013.01); *G06F 2009/45579* (2013.01); *G06F 2213/0024* (2013.01)

(58) Field of Classification Search
None
See application file for complete search history.

(56) References Cited

U.S. PATENT DOCUMENTS

| | | | | |
|---|---|---|---|---|
| 8,316,368 B2* | 11/2012 | Vestal | .................. | G06F 9/4881 718/102 |
| 8,588,970 B2* | 11/2013 | Fletcher | .............. | G05D 1/0291 700/245 |
| 9,172,589 B2* | 10/2015 | Danielsson | ........... | G06F 9/5066 |
| 9,928,098 B2* | 3/2018 | Berrange | ............. | G06F 9/45558 |
| 2012/0271981 A1* | 10/2012 | Bayer | ................... | G06F 3/0664 711/6 |
| 2017/0075711 A1* | 3/2017 | Berrange | ............. | G06F 9/45558 |
| 2017/0249106 A1* | 8/2017 | Apfelbaum | ........... | G06F 3/0664 |

OTHER PUBLICATIONS

Paul J. Parkinson, Applying MILS to multicore avionics systems, Conference: 2nd International Workshop on MILS: Architecture and Assurance for Secure Systems, HiPEAC 2016, At Prague, Czech Republic, Jan. 2016, pp. 1-9.

* cited by examiner

*Primary Examiner* — Henry Tsai
*Assistant Examiner* — Aurangzeb Hassan
(74) *Attorney, Agent, or Firm* — Angel N. Gerdzhikov; Donna P. Suchy; Daniel M. Barbieri

(57) ABSTRACT

A system and related method for PCIe device configuration in a certified multi-core avionics processing system on which several guest operating systems (GOS) are running may allow a GOS to access or communicate with PCIe devices not owned by that GOS. The system may configure PCIe controllers and the PCI devices connected by those controllers by issuing addresses and determine, via a configuration vector of the system hypervisor, which PCIe devices are accessible to which non-owning guest operating systems. The hypervisor may provide each non-owning GOS with the GOS physical addresses corresponding to each non-owned PCIe device accessible to that GOS. Configuration of an unpowered or otherwise unprepared PCIe device may be deferred until device information is requested by the owning GOS to preserve compliance with system timing requirements.

20 Claims, 4 Drawing Sheets

MULTICORE SAFE PCIE SOLUTION

BACKGROUND

A safety-critical avionics processing system may incorporate a multi-core processing environment (MCPE, also multi-core processing resource (MCPR)) within which multiple virtual machines may be maintained (e.g., by a system hypervisor), the virtual machines running a variety of guest operating systems (GOS) across several processing cores. The MCPE may connect to or control various devices via a Peripheral Component Interconnect (PCI) Express (PCIe) interface. Certification standards (e.g., DO-178B/C requirements governing safety-critical avionics software) may require partitioning of the MCPE to prevent catastrophic or hazardous interference within the system, such as a conflict between a first GOS and a second GOS for access to, or use of, a PCI device (or the second GOS interfering with the use of the PCI device by the first GOS). Accordingly, a PCI device (or its associated PCI controller, via which the PCI device interfaces with the MCPE) may be "owned" by a single GOS, to which any interrupts generated by the PCI device are directed. It may be desirable to allow multiple GOS to communicate with a given PCI device, even if one or more of the GOS do not "own" the PCI device.

SUMMARY

In one aspect, embodiments of the inventive concepts disclosed herein are directed to a system for PCI device configuration in a multi-core processing environment (MCPE). The system may include one or more guest operating systems (GOS) executing on the processing cores of the MCPE. The system may include PCI devices connected to the MCPE by PCI controllers, each device owned by one and only one GOS. The system may include a hypervisor for loading or booting the GOS. The hypervisor may configure the PCI controllers by assigning a board physical address to each controller, and configure the PCI devices by assigning a PCI bus address to each device. The hypervisor may determine, for each PCI device, which non-owning GOS may access that PCI device, and provide a corresponding GOS physical address to each accessing GOS (by which the GOS may access the PCI device).

In a further aspect, embodiments of the inventive concepts disclosed herein are directed to an MCPE of one or more processing cores. The MCPE may include one or more guest operating systems (GOS) executing on the processing cores; each GOS may own one or more PCI devices coupled to the MCPE by PCI controllers, exclusively receiving interrupts from "owned" PCI devices. The MCPE may include a hypervisor for loading or booting each GOS; the hypervisor may configure each PCI controller connected to the MCPE by assigning a board physical address to each controller, and configure the PCI device connected to the MCPE by each PCI controller by assigning a PCI bus address to each PCI device. The hypervisor may determine, for each PCI device, which non-owning GOS may access the PCI device, and provide to each accessing GOS the GOS physical addresses corresponding to the PCI devices the GOS may access.

In a still further aspect, embodiments of the inventive concepts disclosed herein are directed to a method for PCI device configuration in a multi-core processing environment (MCPE). The method may include configuring PCI controllers connected to the MCPE by assigning a board physical address to each PCI controller. The method may include configuring the PCI devices connected to the MCPE by each PCI controller, each PCI device owned by a GOS running on the MCPE, by assigning a PCI bus address to each PCI device. The method may include determining which PCI devices may be accessed by one or more GOS other than the owning GOS. The method may include providing GOS physical addresses to the accessing GOS, each GOS physical address corresponding to a PCI device accessible to the accessing GOS.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
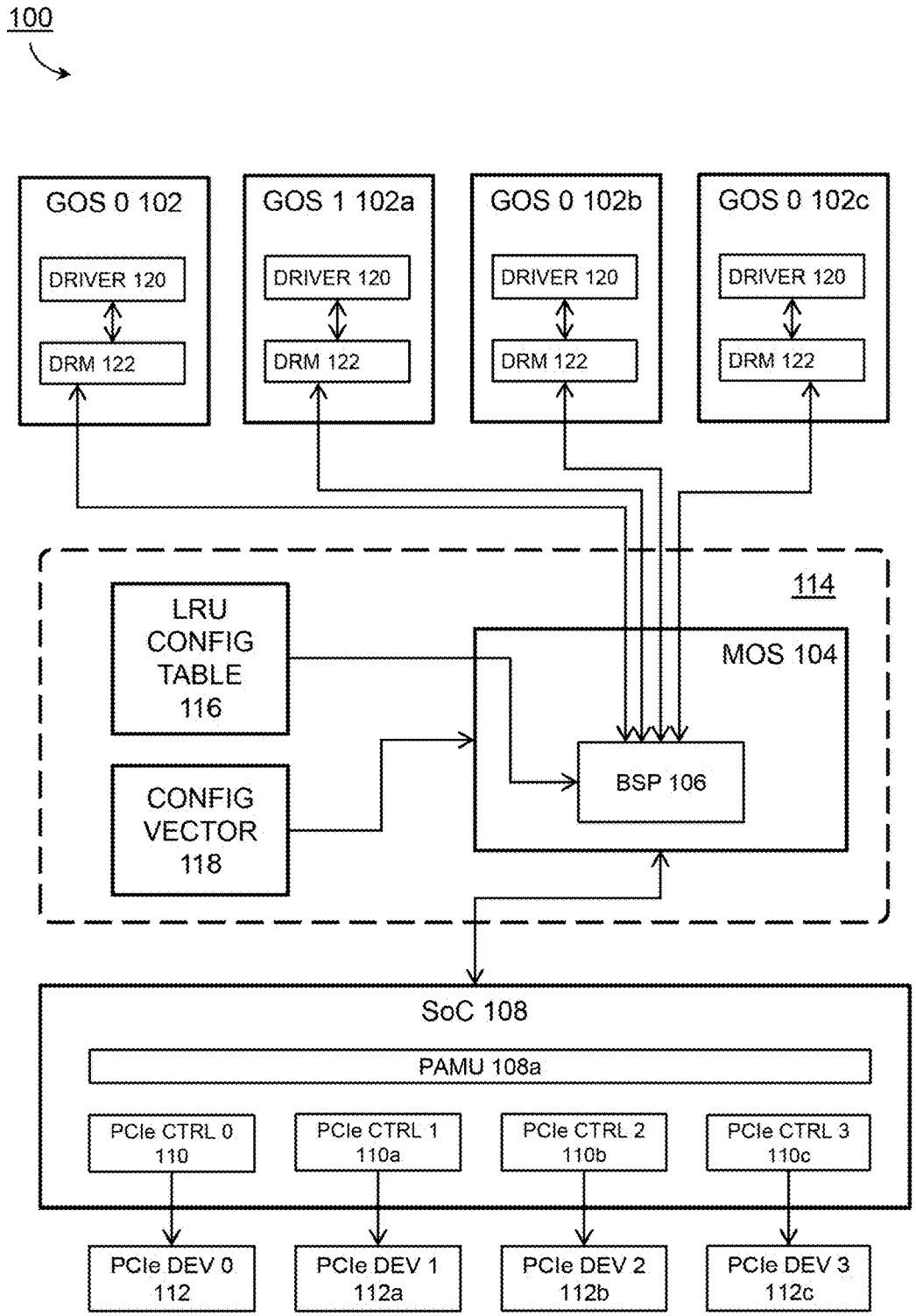
FIG. 1 illustrates an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for configuring PCIe devices and controllers in a multi-core processing environment (MCPE) to have multiple "owners." While each PCIe device is "owned" by a single guest operating system (GOS), to which GOS interrupts from that PCIe device are targeted, the inbound and outbound memory regions of each PCIe device may be made accessible to non-owning GOS running on the MCPE so that a GOS may communicate with PCIe devices it does not "own" without violating the partitioning requirements of a safety-critical avionics processing system.

Referring to FIG. 1, an exemplary embodiment of a system 100 for PCIe device configuration in a multi-core processing environment (MCPE) according to the inventive concepts disclosed herein may include one or more guest operating systems 102 (GOS) running on the processing cores of the MCPE, a module operating system 104 (MOS) including a board support package (BSP) 106, and a system-on-a-chip 108 (SoC) hosting a PCIe controller 110, 110a-c for each PCIe device 112, 112a-c. For example, the system 100 may be embodied in an ARINC 653 compliant avionics processing system. In addition to the MOS 104, the hypervisor 114 of the MCPE (otherwise responsible for managing the virtual machine environment in which each GOS 102 is running) may further maintain a static configuration table (SCT), such as a Line Replaceable Unit (LRU) Configuration Table 116 (LCT), and a configuration vector 118 (CV). For example, the LCT 116 may include target information for enumerating PCIe controllers 110, 110a-c and PCIe devices 112, 112a-c, such as device and vendor identifications, inbound and outbound memory windows, and PCI bridges connecting the controllers and devices. The CV 118 may include, for each GOS 102, 102a-c, resource allocations such as definitions for the PCIe devices 112, 112a-c owned by each GOS (e.g., memory regions for allowing access to Base Address Registers (BARs) of an owned device or PCIe interrupts associated with an owned device and directed to the owning GOS). The system 100 may include PCIe interfaces and hardware, either exclusively or bridged to PCI hardware components, or other similar interfaces wherein a controller transparently extends memory address space to end devices, e.g., Virtual Machine Environment (VME) or Serial RapidIO (SRIO).

The system 100 may be a DO-178B/C certified environment in which each PCIe controller 110 (and the PCIe device 112 connected to the system 100 therethrough, for which the PCIe controller 110 may serve as an interface) is "owned" by a single GOS 102. For example, ownership of a PCIe device 112 connected by a PCIe controller 110 by a GOS 102 may be indicated by the CV 118 in that device interrupts originating at a particular PCIe device 112 may be directed to, and received by, the owning GOS 102 exclusively. The PCIe device 112 may be owned by the GOS 102, the PCIe device 112a owned by the GOS 102a, the PCIe device 112b owned by the GOS 102b, and the PCIe device 112c owned by the GOS 102c. Each GOS 102, 102a-c may further include device drivers 120 and a device resource manager (DRM) 122 for managing the identification of, and access to, the PCIe devices 112, 112a-c respectively owned by each GOS. However, the hypervisor 114 may supplant such "raw" direct memory access (DMA) of a PCIe device 112 by the respective DRM 122 of the device's owning GOS 102 with I/O control calls from the hypervisor. The CV 118 configuration data may allow a PCIe device 112 to be accessed by multiple (and non-owning) GOS 102a-c by providing the GOS 102a-c with access to the relevant inbound and outbound memory regions, thereby allowing the GOS 102a-c to access one or more PCIe devices 112 not owned by that GOS.

Figure 2:
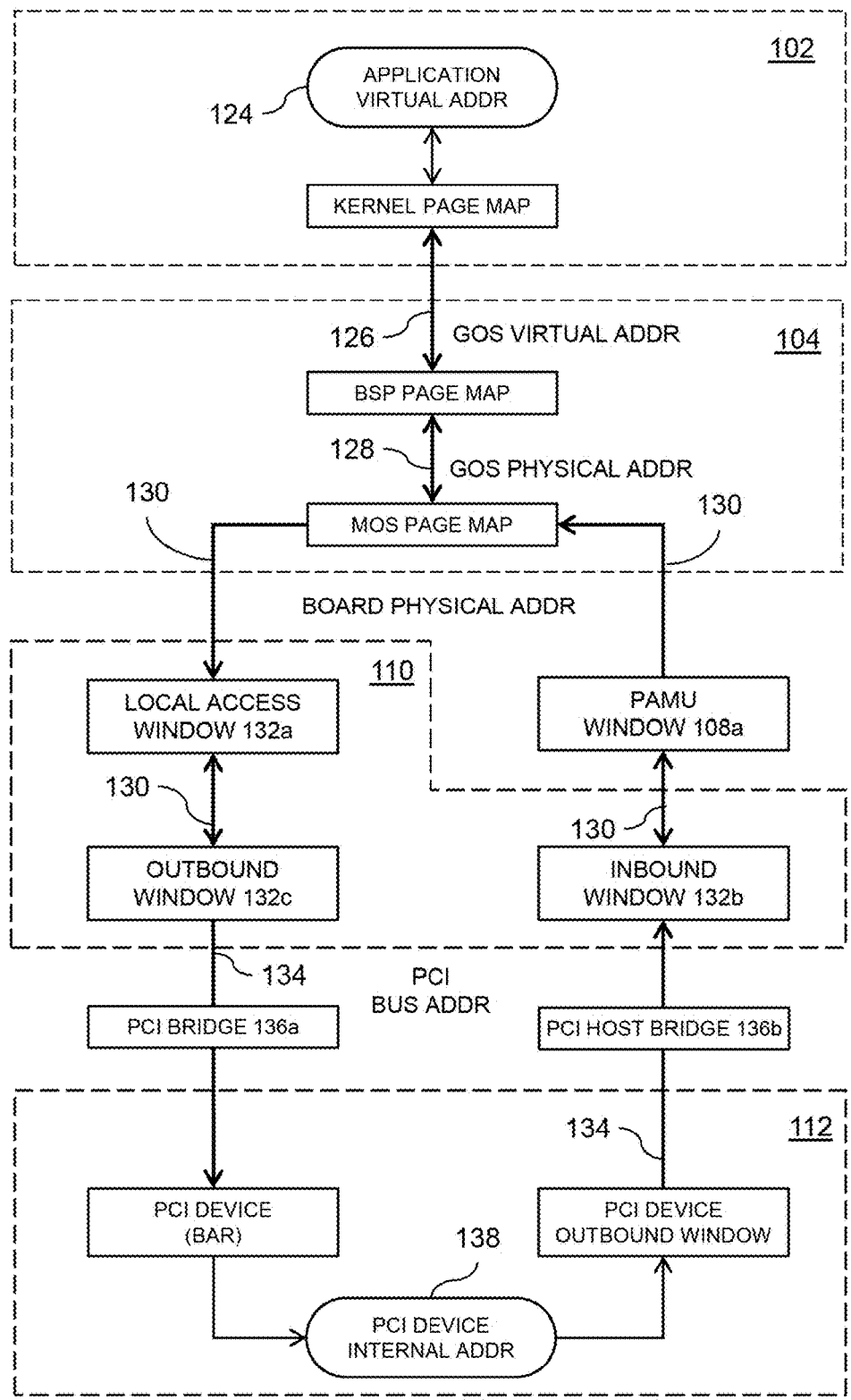
FIG. 2 illustrates address translation operations of the system of FIG. 1.

Referring to FIG. 2, memory window address translation at different levels of the system of FIG. 1 is shown. For example, if an application running on the MCPE of the system 100 wishes to access a PCIe device 112 owned by the GOS 102 (FIG. 1) on which the application is running (e.g., via "raw" DMA as described above), the device driver 120 operating at the kernel level of the GOS may translate a virtual address 124 used by the application to a GOS virtual address 126 for presentation to the GOS. Memory management units (MMU) in the processing cores may translate (on behalf of the GOS 102 and MOS 104) the GOS virtual address 126 to a GOS physical address 128 and the GOS physical address 128 to a board physical address 130. Board physical addresses 130 may provide access to the PCIe controller 110 via local access windows 132a, inbound memory windows 132b (which translate the board physical address 130 to a PCIe bus address 134 for DMA access), and outbound memory windows 132c (which translate the board physical address 130 to a PCIe bus address 134 for BAR access). The PCIe bus address 134 (as issued to the PCIe device 112 by the LCT 116 during the PCIe enumeration process and found in a BAR of the PCIe device) for accessing the PCIe device 112 via a bridge, e.g., an upstream host bridge 136a or a downstream PCI bridge 136b. The PCIe device 112 may translate the PCIe bus address 132 to an internal address 138. For a PCIe device 112 to be accessible to multiple GOS 102, including non-owning GOS 102a-c (FIG. 1), the GOS 102a-c must have access to the GOS physical address 128 corresponding to that PCI device 112.

Figure 3:
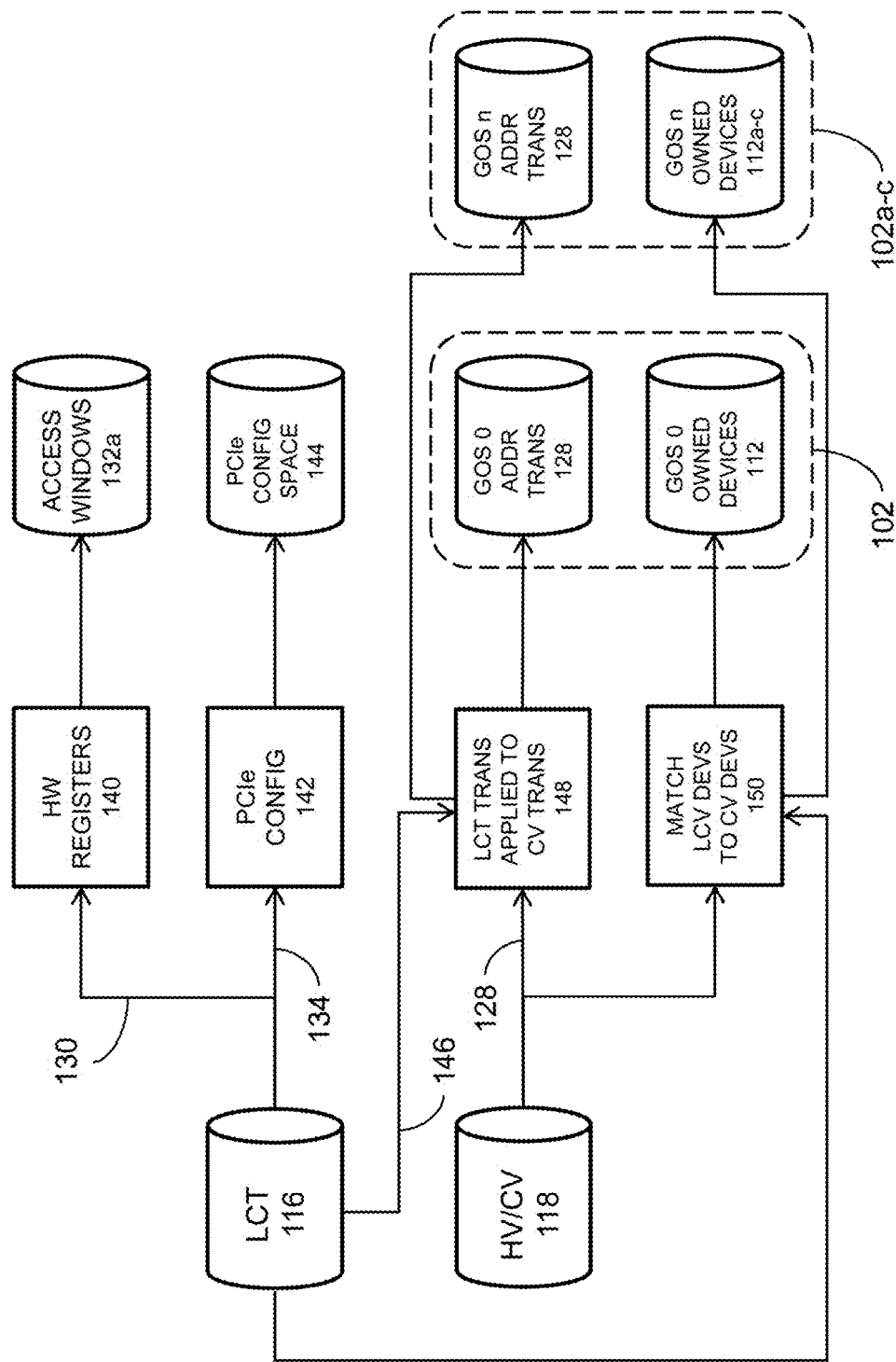
FIG. 3 illustrates PCIe configuration operations of the system of FIG. 1.

Referring to FIG. 3, PCIe configuration operations of the system of FIG. 1 are shown. Configuration operations may be grouped generally into four phases. During a first phase, as the system 100 configures the PAMU 108a (FIG. 1) as well as the PCIe controllers 110, 110a-c (FIG. 1) and their respective local access windows 132a, the board physical addresses 130 by which the PCIe controllers 110, 110a-c and local access windows 132a are accessible may be pushed from the LCT 116 and written to hardware registers 140 of the system 100. During a second phase, PCIe devices 112, 112a-c (FIG. 1) are configured and PCIe bus addresses 134 issued to each PCIe device 112, 112a-c by the LCT 116 may be pushed into device configuration registers 142 throughout the PCIe configuration space (144). Startup timing requirements of the system 100 may be preserved by deferring the configuration of one or more PCIe devices 112, 112a-c if, for example, the device or devices is not yet powered up or otherwise unprepared for configuration. Such unpowered, unprepared, or otherwise uninitialized PCIe devices 112 may remain deferred until configured later, e.g., when requested by the owning GOS 102, so that the startup time of the system 100 is not adversely affected. During a third phase, the bus-to-board translation (146) of PCIe bus addresses 134 to board physical addresses 130 may be pulled from the LCT 116, and the bus-to-board translation 146 applied (148) to board physical addresses 130 indexed by the CV 118 to determine, for each board physical address 130, a corresponding GOS physical address 128 which the GOS 102a-c may use for DMA transfer. During a fourth phase, the system 100 may determine which PCIe devices 112 are accessible to non-owning GOS 102a-c. BAR information may be pulled from the LCT 116 and cross-referenced with memory regions in the CV 118 to match (150) LCT device information to CV device information. The resulting GOS physical addresses 128 for each PCIe device 112 may be passed to each GOS 102a-c allowed by the CV 118 to access the PCIe device 112. If the LCT 114 indicates that message signaled interrupts (MSI) are to be used by a given PCIe device 112 (e.g., and directed to the owning GOS 102), the system 100 may configure MSI for that PCIe device 112.

Figure 4:
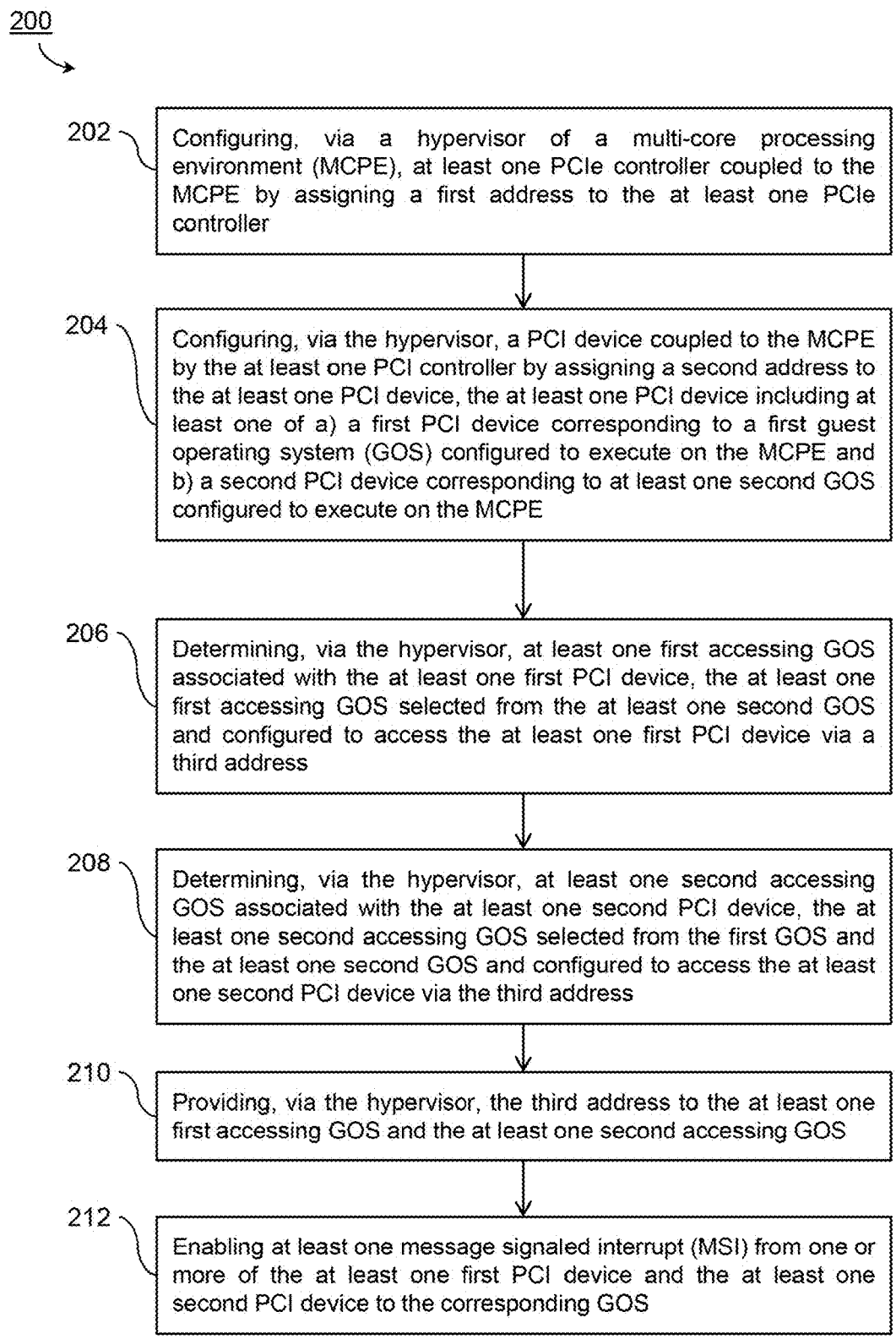
FIG. 4 illustrates an exemplary embodiment of a method according to the inventive concepts disclosed herein.

Referring now to FIG. 4, an exemplary embodiment of a method 200 for PCIe device configuration according to the inventive concepts disclosed herein may be implemented by the system 100 in some embodiments, and may include one or more of the following steps. At a step 202, the hypervisor configures a plurality of PCIe controllers connected to the MCPE by assigning a board physical address to each PCIe controller.

At a step 204, the hypervisor configures the PCIe devices connected to the MCPE by each PCIe controller (each PCIe device owned by a particular GOS running on the MCPE) by assigning a PCIe bus address to each PCIe device. For example, the hypervisor may assign PCIe bus addresses based on a bus-to-board translation (e.g., a translation of each PCIe bus address of a PCI device to the board physical address of its respective PCIe controller) indexed in the LCT. The hypervisor may defer the configuration of a PCIe device, e.g., an inactive, unpowered, uninitialized, or otherwise unprepared PCIe device, until a later point, e.g., until the owning GOS requests the PCIe bus address be assigned to the PCIe device.

At steps 206 and 208, the hypervisor determines the group of accessing GOS for each PCIe device. Each PCIe device may have a group of accessing GOS other than the GOS which owns the PCIe device; the accessing GOS may access the inbound and outbound memory windows of the PCIe device via a GOS physical address. The accessing GOS for each PCIe device may be determined from device information indexed in the CV. The GOS physical addresses may be determined by applying the bus-to-board translations from the LCT to board-to-GOS translations (e.g., a translation of the board physical address of a PCIe controller to the corresponding GOS physical address by which the connected PCIe device may be accessed) indexed in the CV device information.

At a step 210, the hypervisor provides to each accessing GOS the GOS physical address of each PCIe device accessible to that GOS.

The method 200 may include an additional step 212. At the step 212, the hypervisor enables message signaled interrupts from one or more PCIe devices to their respective owning GOS via the LCT.

As will be appreciated from the above, systems and methods according to embodiments of the inventive concepts disclosed herein may allow multiple GOS running in an MCPE to access a single PCIe target while preserving the required partitioning and timing assurances for a safety-critical avionics processing system.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for PCI device configuration in a multi-core processing environment (MCPE), comprising:
   a first guest operating system (GOS) and at least one second GOS configured to execute on a MCPE;
   at least one PCI device coupled to the MCPE by a PCI controller, the at least one PCI device including at least one of
   a) a first PCI device corresponding to the first GOS, and
   b) a second PCI device corresponding to a second GOS selected from the at least one second GOS;
   a hypervisor of the MCPE, the hypervisor configured to load the first GOS and the at least one second GOS;
   configure the at least one PCI controller by assigning a first address to the at least one PCI controller;
   configure the at least one PCI device by assigning a second address to the at least one PCI device;
   determine at least one first accessing GOS associated with the at least one first PCI device, the at least one first accessing GOS selected from the at least one second GOS and configured to access the at least one first PCI device via a third address;
   determine at least one second accessing GOS associated with the at least one second PCI device, the at least one second accessing GOS selected from the first GOS and the at least one second GOS and configured to access the at least one second PCI device via the third address;
   and provide the determined third address to the at least one first accessing GOS and the at least one second accessing GOS.

2. The system of claim 1, further comprising:
at least one of a static configuration table (SCT) and a Line Replaceable Unit (LRU) Configuration Table (LCT), the at least one of a SCT and a LCT including at least one first translation of the first address assigned to the at least one PCI controller to the second address assigned to the PCI device coupled to the MCPE by the at least one PCI controller.

3. The system of claim 2, further comprising:
a configuration vector (CV) including at least one second translation of the second address to the third address by which the PCI device may be accessed by one or more of the at least one first accessing GOS and the at least one second accessing GOS.

4. The system of claim 1, wherein the hypervisor is configured to defer the assignment of the second address to the at least one PCI device until the assignment is requested by the GOS corresponding to the at least one deferred PCI device, the at least one PCI device including at least one of an inactive PCI device and an unpowered PCI device.

5. The system of claim 1, wherein the hypervisor is configured to enable at least one message signaled interrupt (MSI) from the at least one PCI device to the GOS corresponding to the at least one PCI device.

6. The system of claim 1, wherein:
the at least one PCI device includes at least one of a PCIe device, a VME device, and a SRIO device; and
the at least one PCI controller includes at least one of a PCIe controller, a VME controller, and a SRIO controller.

7. The system of claim 1, wherein the system is embodied in an ARINC 653 compliant avionics processing system.

8. A multi-core processing environment (MCPE), comprising:
one or more processing cores;
a first guest operating system (GOS) and at least one second GOS configured to execute on the one or more cores;
a hypervisor coupled to the one or more processing cores and configured to:
load the first GOS and the at least one second GOS;
configure at least one PCI controller coupled to the MCPE by assigning a first address to the at least one PCI controller;
configure a PCI device coupled to the MCPE by the at least one PCI controller by assigning a second address to the at least one PCI device, the at least one PCI device including at least one of a) a first PCI device corresponding to a first guest operating system (GOS) configured to execute on the MCPE and b) a second PCI device corresponding to at least one second GOS configured to execute on the MCPE;
determine at least one first accessing GOS associated with the at least one first PCI device, the at least one first accessing GOS selected from the at least one second GOS and configured to access the at least one first PCI device via a third address;
determine at least one second accessing GOS associated with the at least one second PCI device, the at least one second accessing GOS selected from the first GOS and the at least one second GOS and configured to access the at least one second PCI device via the third address;
and provide the third address to the at least one first accessing GOS and the at least one second accessing GOS.

9. The MCPE of claim 8, wherein the hypervisor includes at least one of a static configuration table (SCT) and a Line Replaceable Unit (LRU) Configuration Table (LCT), the at least one of a SCT and a LCT including at least one first translation of the first address assigned to the at least one PCI controller to the second address assigned to the PCI device coupled to the MCPE by the at least one PCI controller.

10. The MCPE of claim 9, wherein the hypervisor includes a configuration vector (CV) including at least one second translation of the second address to the third address by which the PCI device may be accessed by one or more of the at least one first accessing GOS and the at least one second accessing GOS.

11. The MCPE of claim 8, wherein the hypervisor is configured to defer the assignment of the second address to at least one PCI device until the assignment is requested by the GOS corresponding to the at least one deferred PCI device.

12. The MCPE of claim 11, wherein the at least one deferred PCI device includes at least one of an inactive PCI device and an unpowered PCI device.

13. The MCPE of claim 8, wherein the hypervisor is configured to enable at least one message signaled interrupt (MSI) from the at least one PCI device to the GOS corresponding to the at least one PCI device.

14. A method for PCI device configuration in a multi-core processing environment, the method comprising:
configuring, via a hypervisor of a multi-core processing environment (MCPE), at least one PCI controller coupled to the MCPE by assigning a first address to the at least one PCI controller;
configuring, via the hypervisor, a PCI device coupled to the MCPE by the at least one PCI controller by assigning a second address to the at least one PCI device, the at least one PCI device including at least one of a) a first PCI device corresponding to a first guest operating system (GOS) configured to execute on the MCPE and b) a second PCI device corresponding to at least one second GOS configured to execute on the MCPE;
determining, via the hypervisor, at least one first accessing GOS associated with the at least one first PCI device, the at least one first accessing GOS selected from the at least one second GOS and configured to access the at least one first PCI device via a third address;
determining, via the hypervisor, at least one second accessing GOS associated with the at least one second PCI device, the at least one second accessing GOS selected from the first GOS and the at least one second GOS and configured to access the at least one second PCI device via the third address;
and
providing, via the hypervisor, the third address to the at least one first accessing GOS and the at least one second accessing GOS.

15. The method of claim 14, wherein configuring, via the hypervisor, a PCI device coupled to the MCPE by the at least one PCI controller by assigning a second address to the at least one PCI device, the at least one PCI device including at least one of a) a first PCI device corresponding to a first guest operating system (GOS) configured to execute on the MCPE and b) a second PCI device corresponding to at least one second GOS configured to execute on the MCPE includes:

configuring, via the hypervisor, a PCI device coupled to the MCPE by the at least one PCI controller by assigning a second address to the at least one PCI device based on a first translation to the second address from the first address assigned to the at least one PCI controller.

16. The method of claim 15, wherein:
determining, via the hypervisor, at least one first accessing GOS associated with the at least one first PCI device, the at least one first accessing GOS selected from the at least one second GOS and configured to access the at least one first PCI device via a third address includes determining the at least one third address based on the first translation and a second translation to the third address from the second address assigned to the at least one first PCI device; and
determining, via the hypervisor, at least one second accessing GOS associated with the at least one second PCI device, the at least one second accessing GOS selected from the first GOS and the at least one second GOS and configured to access the at least one second PCI device via the third address includes determining the at least one third address based on the first translation and a second translation to the third address from the second address assigned to the at least one second PCI device.

17. The method of claim 14, wherein:
determining, via the hypervisor, at least one first accessing GOS associated with the at least one first PCI device, the at least one first accessing GOS selected from the at least one second GOS and configured to access the at least one first PCI device via a third address includes determining, via a configuration vector (CV) of the hypervisor, at least one first accessing GOS associated with the at least one first PCI device; and determining, via the hypervisor, at least one second accessing GOS associated with the at least one second PCI device, the at least one second accessing GOS selected from the first GOS and the at least one second GOS and configured to access the at least one second PCI device via the third address includes determining, via a configuration vector (CV) of the hypervisor, at least one second accessing GOS associated with the at least one second PCI device.

18. The method of claim 14, wherein configuring, via the hypervisor, a PCI device coupled to the MCPE by the at least one PCI controller by assigning a second address to the at least one PCI device, the at least one PCI device including at least one of a) a first PCI device corresponding to a first guest operating system (GOS) configured to execute on the MCPE and b) a second PCI device corresponding to at least one second GOS configured to execute on the MCPE includes:
deferring the assignment of the second address to the at least one PCI device until the corresponding GOS requests the assignment.

19. The method of claim 18, wherein deferring the assignment of the second address to the at least one PCI device until the corresponding GOS requests the assignment includes:
deferring the assignment of the second address to at least one of an inactive PCI device and an unpowered PCI device until the corresponding GOS requests the assignment.

20. The method of claim 14, further comprising:
enabling at least one message signaled interrupt (MSI) from one or more of the at least one first PCI device and the at least one second PCI device to the corresponding GOS.

* * * * *